United States Patent
Gambhir-Parekh

(10) Patent No.: US 11,785,515 B2
(45) Date of Patent: *Oct. 10, 2023

(54) LOCALLY-GENERATED TEIDS FOR CORE HIGH AVAILABILITY

(71) Applicant: Parallel Wireless, Inc., Nashua, NH (US)

(72) Inventor: Manisha Sameer Gambhir-Parekh, Pune (IN)

(73) Assignee: Parallel Wireless, Inc., Nashua, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/543,976

(22) Filed: Dec. 7, 2021

(65) Prior Publication Data
US 2022/0095185 A1  Mar. 24, 2022

Related U.S. Application Data

(63) Continuation of application No. 16/675,220, filed on Nov. 5, 2019, now Pat. No. 11,197,215.

(60) Provisional application No. 62/755,959, filed on Nov. 5, 2018.

(51) Int. Cl.
  *H04W 4/00* (2018.01)
  *H04W 36/12* (2009.01)
  *H04W 36/30* (2009.01)
  *H04W 88/16* (2009.01)

(52) U.S. Cl.
  CPC ........... *H04W 36/12* (2013.01); *H04W 36/30* (2013.01); *H04W 88/16* (2013.01)

(58) Field of Classification Search
  CPC ..... H04W 36/12; H04W 36/30; H04W 88/16; H04W 24/04; H04W 36/0033
  USPC ......................................................... 370/331
  See application file for complete search history.

(56) References Cited

U.S. PATENT DOCUMENTS

| | | | | |
|---|---|---|---|---|
| 8,401,068 | B2* | 3/2013 | Ulupinar | H04L 61/50 |
| | | | | 375/240 |
| 9,204,336 | B2* | 12/2015 | Mihály | H04L 12/4633 |
| 9,532,390 | B2* | 12/2016 | John | H04W 76/12 |
| 9,596,628 | B2* | 3/2017 | Kedalagudde | H04L 45/64 |
| 10,123,374 | B2* | 11/2018 | Lau | H04W 36/0022 |
| 10,299,171 | B2* | 5/2019 | Yadhav | H04W 36/08 |

(Continued)

FOREIGN PATENT DOCUMENTS

WO  2018068536 A1  4/2018

OTHER PUBLICATIONS

"Move N4 Sessions to a Backup SMF with UDSF Assistance", 3GPP TSG CT WG4 Meeting #86bis, Vilnius, Republic of Lithuania, Oct. 5, 2018.

*Primary Examiner* — Amancio Gonzalez
(74) *Attorney, Agent, or Firm* — Michael Y. Saji; David W. Rouille

(57) ABSTRACT

Systems, methods and computer software are disclosed for providing core High Availability (HA) for a wireless network. In one embodiment, a method is disclosed, comprising: providing a first node, a second node and a third node; allocating a set of locally generated Tunnel Endpoint Identifiers (TEIDs) for UEs anchored on the second node; detecting, by a first node, a second node having a connectivity issue; and migrating a User Equipment (UE) connected to the second node to a third node which is accessible; using the set of locally generated TEIDs to identify the UE migration.

20 Claims, 10 Drawing Sheets

(56) References Cited

U.S. PATENT DOCUMENTS

| | | | | |
|---|---|---|---|---|
| 10,470,080 | B2* | 11/2019 | Fiaschi | H04W 28/0268 |
| 10,524,166 | B2* | 12/2019 | Youn | H04W 92/02 |
| 10,602,349 | B2* | 3/2020 | Cooper | H04W 28/0842 |
| 10,609,635 | B2* | 3/2020 | Ravishankar | H04W 76/11 |
| 10,728,829 | B2* | 7/2020 | Xu | H04W 4/023 |
| 10,771,981 | B2* | 9/2020 | Goldhamer | H04W 16/02 |
| 11,197,215 | B2* | 12/2021 | Gambhir-Parekh | H04W 36/12 |
| 2012/0063300 | A1 | 3/2012 | Sahin et al. | |
| 2017/0064760 | A1* | 3/2017 | Kandagadla | H04W 12/04 |
| 2018/0049275 | A1 | 2/2018 | Agarwal et al. | |
| 2018/0338265 | A1* | 11/2018 | Goel | H04L 45/02 |
| 2019/0191339 | A1* | 6/2019 | Li | H04W 76/22 |
| 2019/0191479 | A1* | 6/2019 | Xu | H04W 40/36 |

* cited by examiner

LOCALLY-GENERATED TEIDS FOR CORE HIGH AVAILABILITY

CROSS-REFERENCE TO RELATED APPLICATIONS

This application is a continuation of U.S. application Ser. No. 16/675,220, filed Nov. 5, 2019, which claims priority under 35 U.S.C. § 119(e) to U.S. Provisional Pat. App. No. 62/755,959, filed Nov. 5, 2018, titled "Locally-Generated TEIDs for Core High Availability", all of which is hereby incorporated by reference in its entirety for all purposes. This application hereby incorporates by reference, for all purposes, each of the following U.S. Patent Application Publications in their entirety: US20170013513A1; US20170026845A1; US20170055186A1; US20170070436A1; US20170077979A1; US20170019375A1; US20170111482A1; US20170048710A1; US20170127409A1; US20170064621A1; US20170202006A1; US20170238278A1; US20170171828A1; US20170181119A1; US20170273134A1; US20170272330A1; US20170208560A1; US20170288813A1; US20170295510A1; US20170303163A1; and US20170257133A1.

This application also hereby incorporates by reference U.S. Pat. No. 8,879,416, "Heterogeneous Mesh Network and Multi-RAT Node Used Therein," filed May 8, 2013; U.S. Pat. No. 9,113,352, "Heterogeneous Self-Organizing Network for Access and Backhaul," filed Sep. 12, 2013; U.S. Pat. No. 8,867,418, "Methods of Incorporating an Ad Hoc Cellular Network Into a Fixed Cellular Network," filed Feb. 18, 2014; U.S. patent application Ser. No. 14/034,915, "Dynamic Multi-Access Wireless Network Virtualization," filed Sep. 24, 2013; U.S. patent application Ser. No. 14/289,821, "Method of Connecting Security Gateway to Mesh Network," filed May 29, 2014; U.S. patent application Ser. No. 14/500,989, "Adjusting Transmit Power Across a Network," filed Sep. 29, 2014; U.S. patent application Ser. No. 14/506,587, "Multicast and Broadcast Services Over a Mesh Network," filed Oct. 3, 2014; U.S. patent application Ser. No. 14/510,074, "Parameter Optimization and Event Prediction Based on Cell Heuristics," filed Oct. 8, 2014, U.S. patent application Ser. No. 14/642,544, "Federated X2 Gateway," filed Mar. 9, 2015, and U.S. patent application Ser. No. 14/936,267, "Self-Calibrating and Self-Adjusting Network," filed Nov. 9, 2015; U.S. patent application Ser. No. 15/607,425, "End-to-End Prioritization for Mobile Base Station," filed May 26, 2017; U.S. patent application Ser. No. 15/803,737, "Traffic Shaping and End-to-End Prioritization," filed Nov. 27, 2017, each in its entirety for all purposes.

This document also hereby incorporates by reference U.S. Pat. Nos. 9,107,092, 8,867,418, and 9,232,547 in their entirety. This document also hereby incorporates by reference U.S. patent application Ser. No. 14/822,839, U.S. patent application Ser. No. 15/828,427, U.S. Pat. App. Pub. Nos. US20170273134A1, US20170127409A1 in their entirety.

This application also hereby incorporates by reference in their entirety each of the following U.S. Pat. applications or Pat. App. Publications: US20180242396A1 (PWS-72501US02); US20150098387A1 (PWS-71731US01); US20170055186A1 (PWS-71815US01); US20170273134A1 (PWS-71850US01); US20170272330A1 (PWS-71850US02); and Ser. No. 15/713,584 (PWS-71850US03). This application also hereby incorporates by reference in their entirety U.S. patent application Ser. No. 16/424,479, "5G Interoperability Architecture," filed May 28, 2019; and U.S. Provisional Pat. Application No. 62/804,209, "5G Native Architecture," filed Feb. 11, 2019.

Features and characteristics of and pertaining to the systems and methods described in the present disclosure, including details of the multi-RAT nodes and the gateway described herein, are provided in the documents incorporated by reference.

BACKGROUND

Traditional system behavior consist of EnodeB, NodeB, enhancxed packet data gateway (ePDG) and TWANGW connection to multiple PGWs, SGW and a pool of MMEs/AAA server. The EnodeB, NodeB, ePDG and TWANGW may have High availability (HA) feature built in. The purpose of the HA is to provide uninterrupted connectivity to UEs in case of a system failure at the respective nodes. Similarly a system may be implemented at MME, AAA server, SGW, PGW, etc. to handle system failures. There may be a system in place to handle link failures between the core nodes such as alternate routes etc. There could be other failures in the system related to protocol issue such as S1AP connectivity, Diameter connectivity etc.

SUMMARY

A system is disclosed to identify a mechanism to provide undisrupted service to UE at eNodeB, NodeB, BSC, GSM-GPRS, TWANGW or ePDG, gNB in case connectivity to core nodes such as MME, SGW, AAA server, PGW, SGSN, GGSN, AMF, UPF, SMF, etc. is lost. Further, a system for identifying operators in Multi Operator Code Networks, neutral host network sharing, Gateway Core Network, etc., and for identifying virtual networks that run on top of shared physical network, is disclosed.

In one embodiment, a method may be disclosed for providing locally-generated TEIDs for core HA. The method may include providing a first node, a second node and a third node; allocating a set of locally generated Tunnel Endpoint Identifiers (TEIDs) for UEs anchored on the second node; detecting, by a first node, a second node having a connectivity issue; and migrating a User Equipment (UE) connected to the second node to a third node which is accessible; using the set of locally generated TEIDs to identify the UE migration.

In another embodiment, a system may be provided for providing locally-generated TEIDs for core HA. The system may include a first node, a second node and a third node. A set of Tunnel Endpoint Identifiers (TEIDs) are locally generated for UEs anchored on the second node. The first node detects a second node having a connectivity issue and migrates a User Equipment (UE) connected to the second node to a third node which is accessible; using the set of locally generated TEIDs to identify the UE migration.

In another embodiment a non-transitory computer-readable medium contains instructions for providing locally-generated TEIDs for core HA which, when executed, cause a first node to perform steps comprising: detecting, by a first node, a second node having a connectivity issue; migrating a User Equipment (UE) connected to the second node to a third node which is accessible; using the set of locally generated TEIDs for UEs anchored on the second node to identify the UE migration.

DETAILED DESCRIPTION

A set of TEIDs can identify a core, such as MME, PGW, SGW, SGSN, GGSN. This can be used to achieve high availability of core.

The TEID may be generated locally at the RAN, at a mobile edge compute (MEC) node, at a node near the RAN, at a gateway of the RAN, or at another location. The TEID may be generated according to a known pattern, or based on a hardware address such as a MAC address or RAN hardware identifier, or based on a predetermined allocation.

Figure 1:
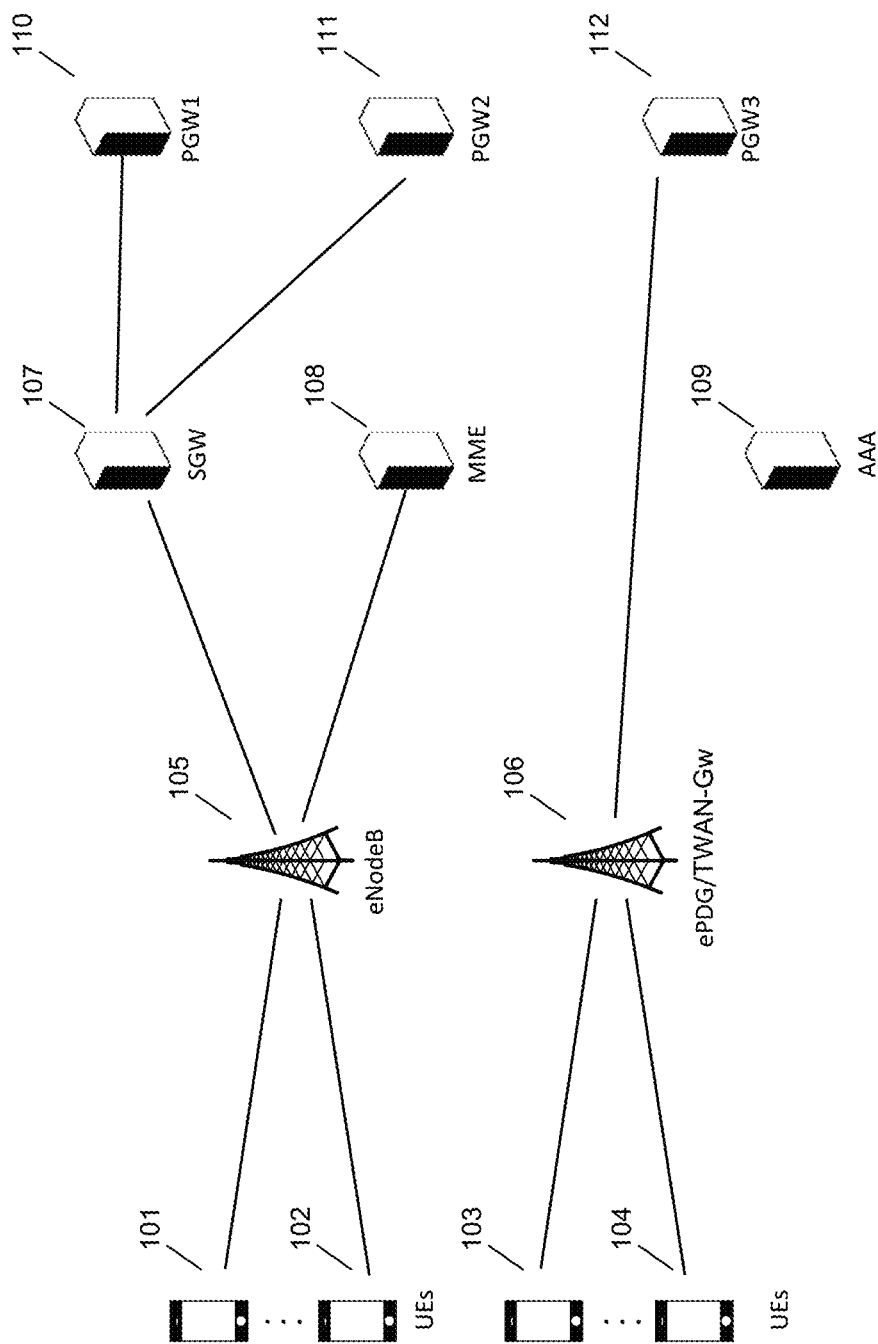
FIG. 1 is a system diagram showing core connections, in accordance with some embodiments.
Figure 2:
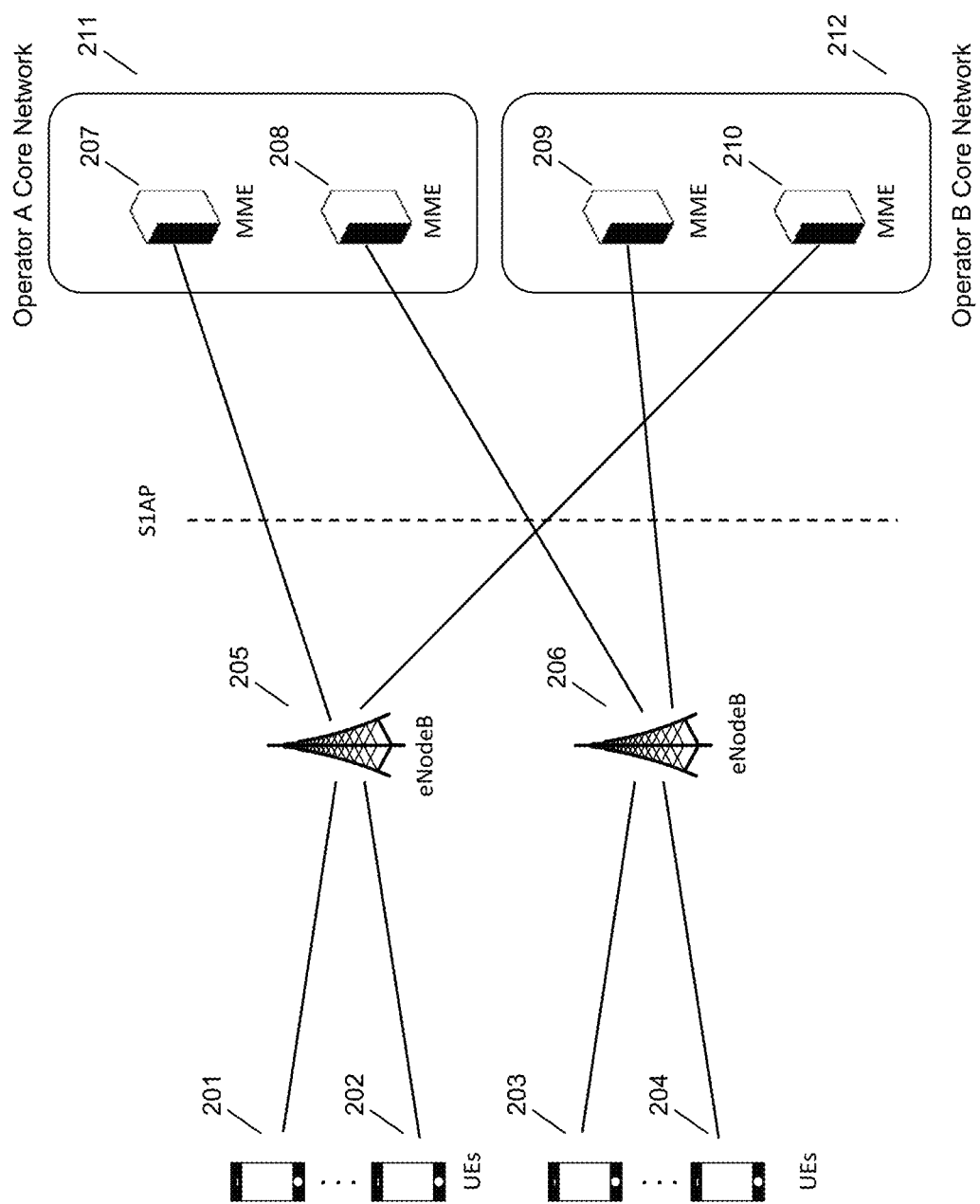
FIG. 2 is a system diagram showing MOCN, in accordance with some embodiments.
Figure 3:
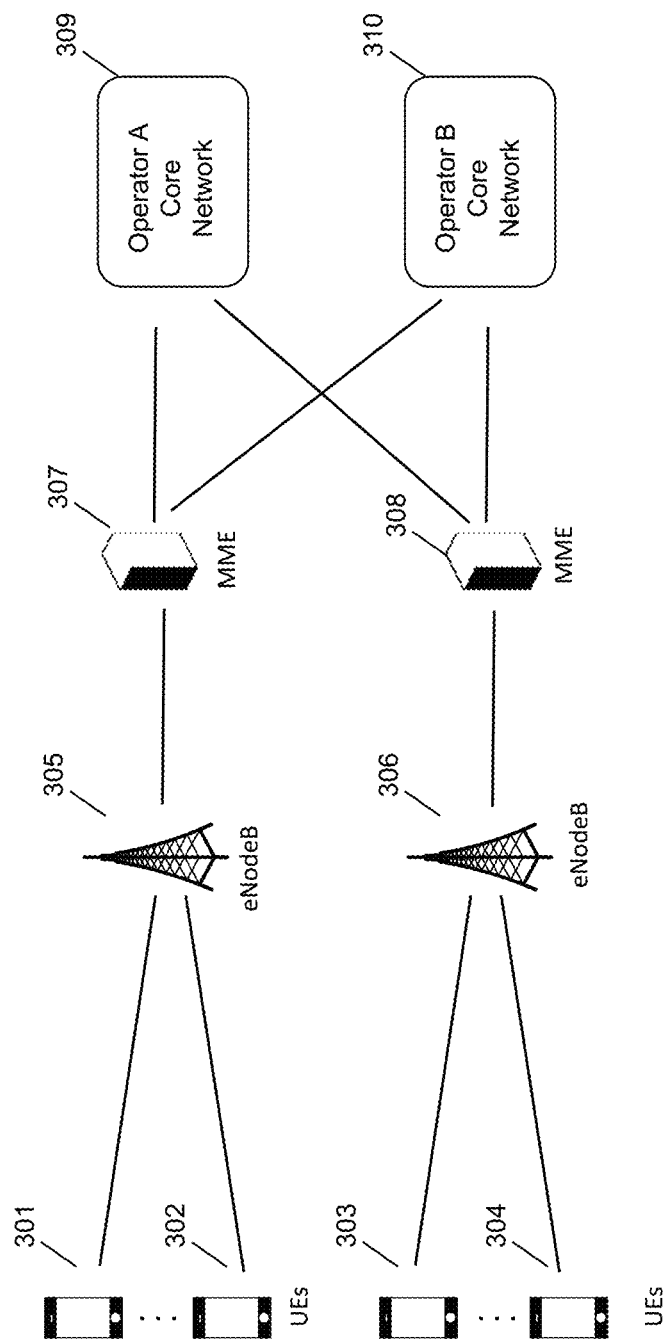
FIG. 3 is a system diagram showing GWCN, in accordance with some embodiments.
Figure 4:
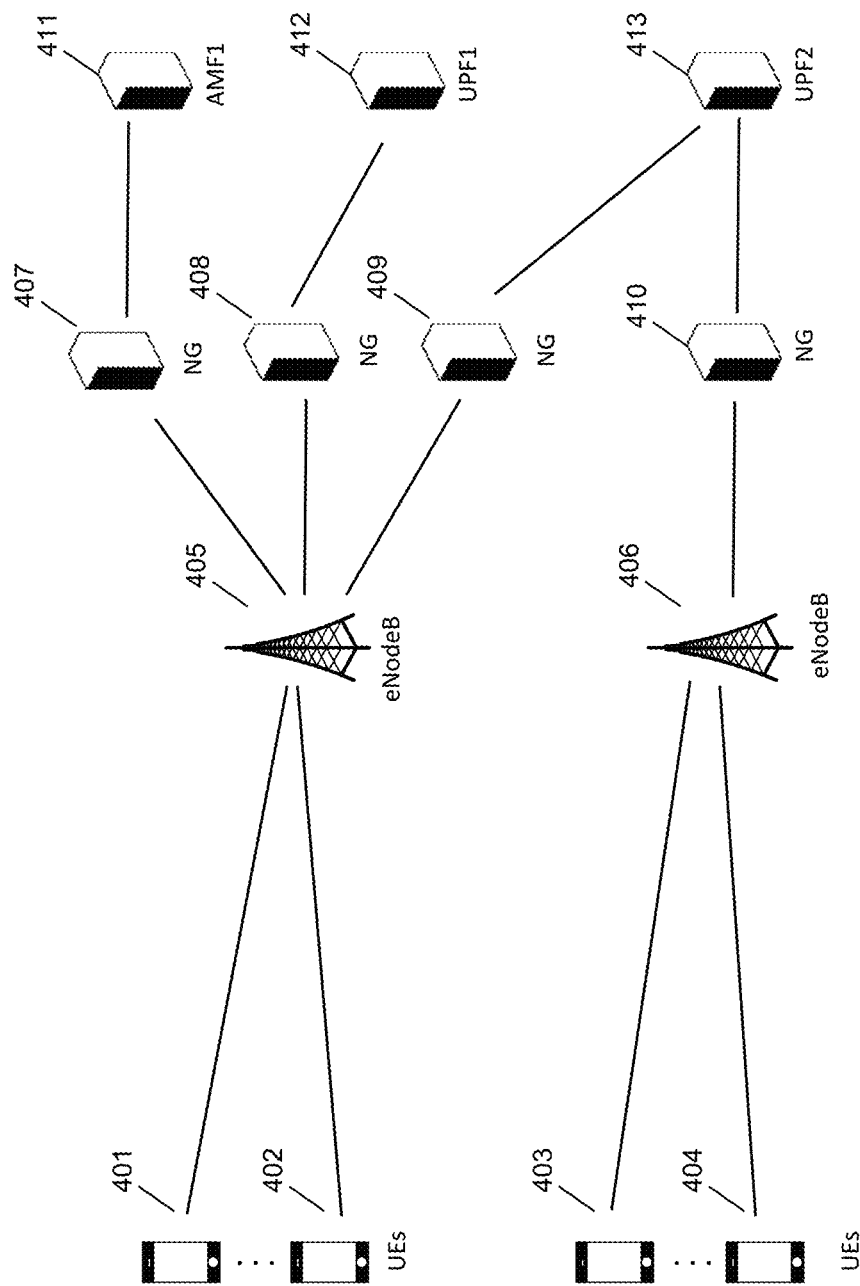
FIG. 4 is a system diagram of a 5G core, in accordance with some embodiments.

The present disclosure describes systems and methods to identity all the UEs connecting to a core node to achieve core High Availability. FIG. 1 depicts the traditional system with few nodes. Please note that all the nodes of the system are not covered in the figures. FIGS. 2-3 depict MCON and GAWN scenarios in accordance with some embodiments. FIG. 4 depicts a 5G core in accordance with some embodiments.

If there is an outage or there is no connectivity to a particular core node or link issue, UE connections are disrupted. And it may take some time to restore the connectivity. This results in significant down time.

Instead, if a node detects its peer has a connectivity issue, it can migrate the UEs to another peer which is accessible. For this the node needs to identify the UEs attached to the failing node so that they can be immediately shifted to available peer. As shown in FIGS. 2-4, with the HNG detecting connectivity failure with SGW1 or/and MME1, HNG migrates the UEs connected to that SGW1 or MME1 to the one which provide connectivity. This can be achieved by allocating a set of locally generated TEIDs for UEs anchored on a particular node. This set, for example, can be a group of 2^20 GTPU TEIDs assigned to all UEs connecting to SGW1 or MME1 and using this set to identify the UE migration. In some embodiments, HNG can migrate all such UEs connected to such TEID. In effect, the TEID is used to identify a core. This helps in undisrupted connectivity or minimal/short disruption to the affected UE significantly reducing the down time. Similarly, the UEs can be migrated from SGW1 to SGW2 by some controller thus further reducing the tunnel management signaling between eNodeB and SGW2 or MME2. This controller can then update the EnodeB about new SGW or MME it needs to connect to. Similarly, a controller or ePDG/TWANGW can migrate UEs from PGW2 to PGW3, from AAA1 to AAA2 on detecting failure at PGW2 and AAA1, respectively, and may use TEIDs, in some embodiments.

In some embodiments, just the SGW, just the MME, or just a single core node can be used as the source of the GTPU TED that is used to identify a core. In some embodiments, each core node is treated separately; in other embodiments, for example, each core may be assigned a single value. In some embodiments, a tunnel endpoint identifier (TEID) may be used as it is already assigned and available at the base station for use in GTP establishment. The GTPU TEID also has the useful property that it is on many communications from the UE to the core and vice versa, allowing redirection and failover of data that is already in flight.

In MOCN (multi-operator core network) and GWCN (gateway core network), some or whole part of S1AP IDs can identify all the UE belonging to individual operators and vice versa. Virtual networks can be identified using some or whole part of various identifiers such as TEID. These UEs can also be migrated from one node to another when there is a resource crunch on existing system. Any other tunnel identifiers can also be used.

In some embodiments, a base station (node) (1) locally generates a set of TEIDs (tunnel identifiers), and assigns them to tunnels; (2) stores a mapping for each TEID to the individual core node or individual core. In some embodiments, when there is a core failure (shown in the figures as dotted lines), the controller (3) migrates all UEs that are identified by that TEID, which identifies a core.

As well, 5G is the next generation Mobile Communication technology following the 4G/LTE. 3GPP has been working on defining the standards for 5G as part of 3GPP Rel 15 and 16. Starting 1G and then followed by 2G, 3G and 4G, each generation has the laid the foundation for the next generation in order to cater to newer use cases and verticals. 4G was the first generation that introduced flat architecture with all-IP architecture. 4G enabled and flourished several new applications and use case. 5G is going to be not just about higher data rates but about total user experience and is going to cater to several new enterprise use cases like Industrial automation, Connected Cars, Massive IOT and others. This will help operators to go after new revenue opportunities.

Launching 5G network will need significant investment as it will need RAN and Packet Core upgrade. 3GPP has defined a new 5G NR and new 5G Core. Eventually all the operators will want to head towards a complete 5G network coverage with the new 5G Standalone Core, given the several new features and capabilities that the new 5G Standalone network brings in. But given the significant cost involved, 3GPP has defined number of different intermediate solutions that can provide gradual migration from current 4G network to the eventual native 5G network.

Architecture Diagram

FIG. 1 is a system diagram showing core connections, in accordance with some embodiments.

FIG. 2 is a system diagram showing MOCN, in accordance with some embodiments.

FIG. 3 is a system diagram showing GWCN, in accordance with some embodiments.

FIG. 4 is a system diagram of a 5G core, in accordance with some embodiments.

Figure 5:
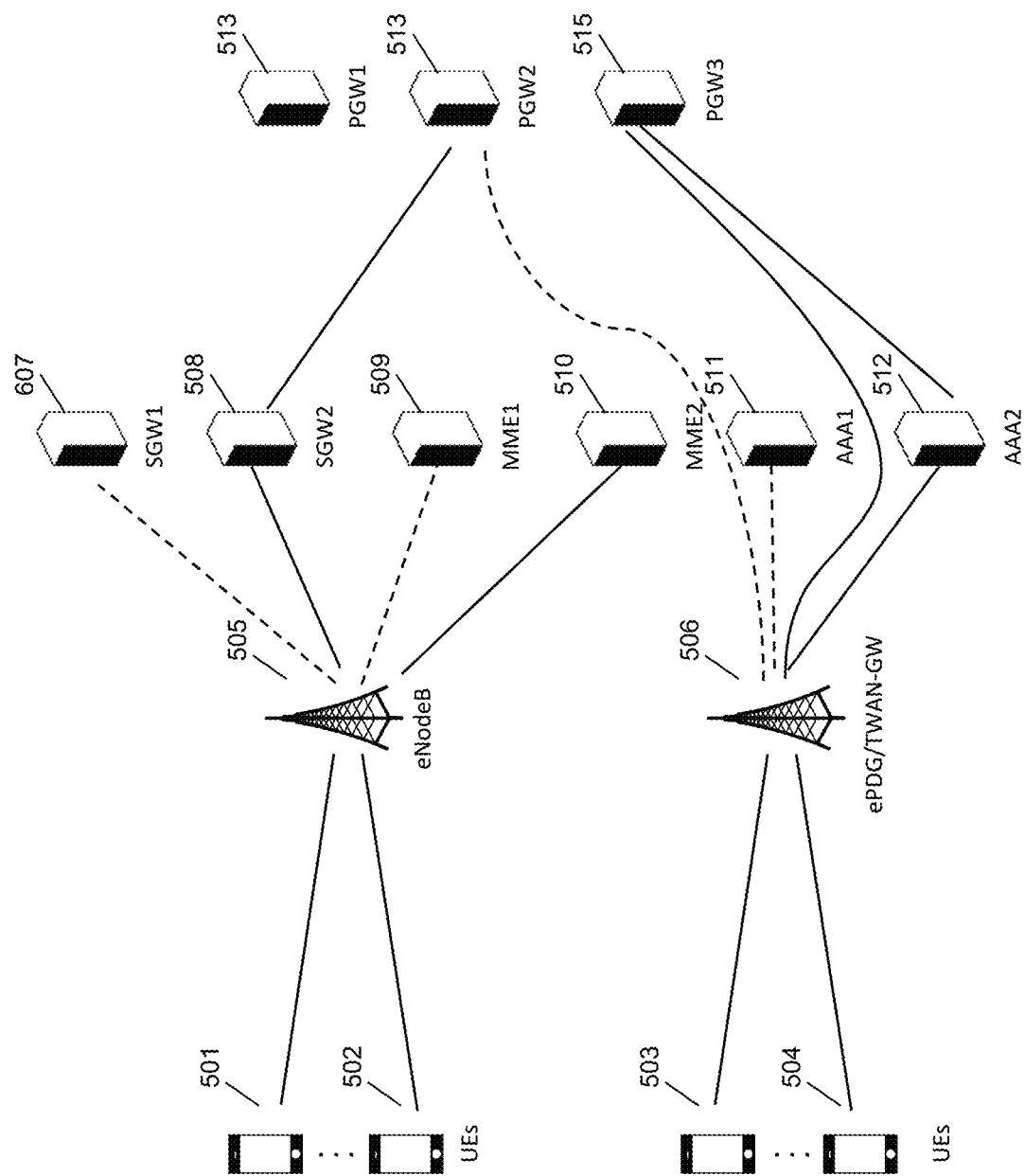
FIG. 5 is a system diagram showing core HA when a connection to SGW/PGW goes down, in accordance with some embodiments.

FIG. 5 is a system diagram showing core HA when a connection to SGW/PGW goes down, in accordance with some embodiments.

Figure 6:
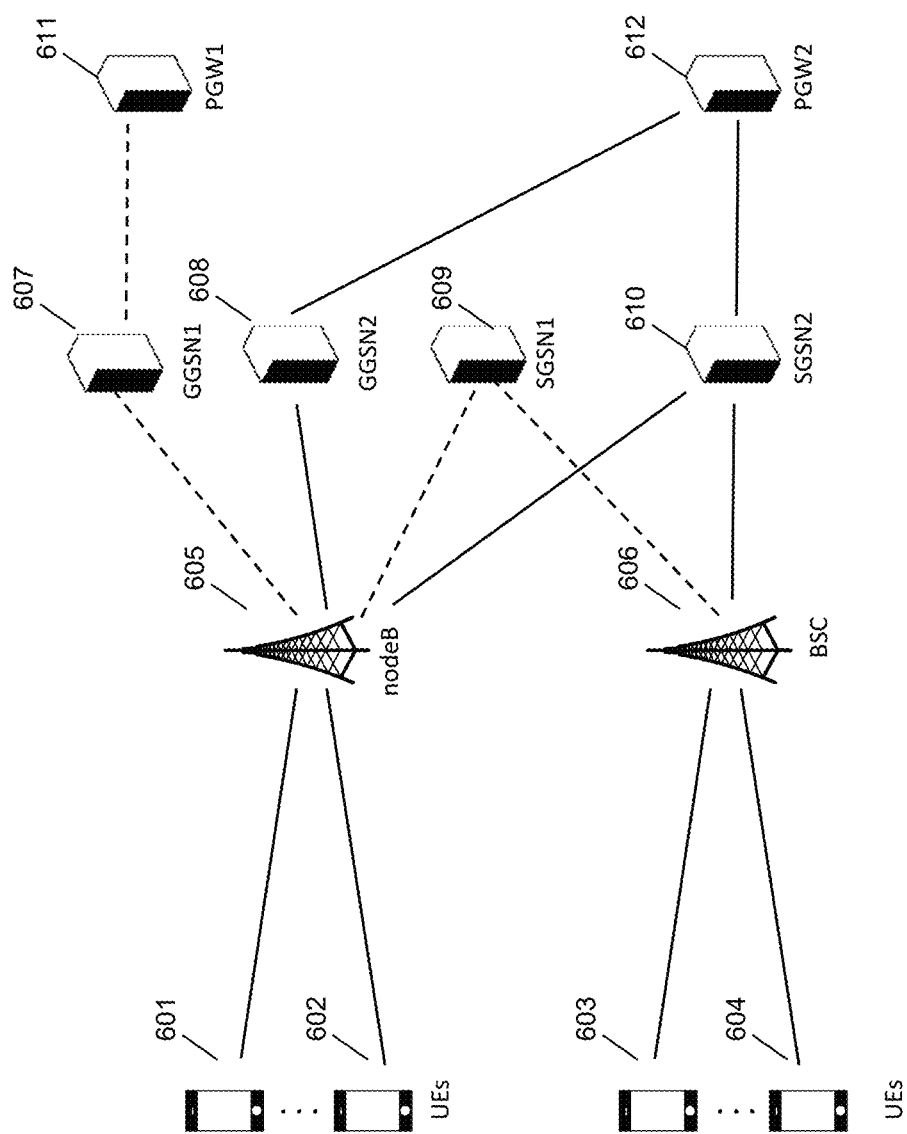
FIG. 6 is a system diagram where a 3G/2G connection to SGSN or GGSN is lost and the UEs are migrated to a next available core node, in accordance with some embodiments.

FIG. 6 is a system diagram where a 3G/2G connection to SGSN or GGSN is lost and the UEs are migrated to a next available core node, in accordance with some embodiments.

Figure 7:
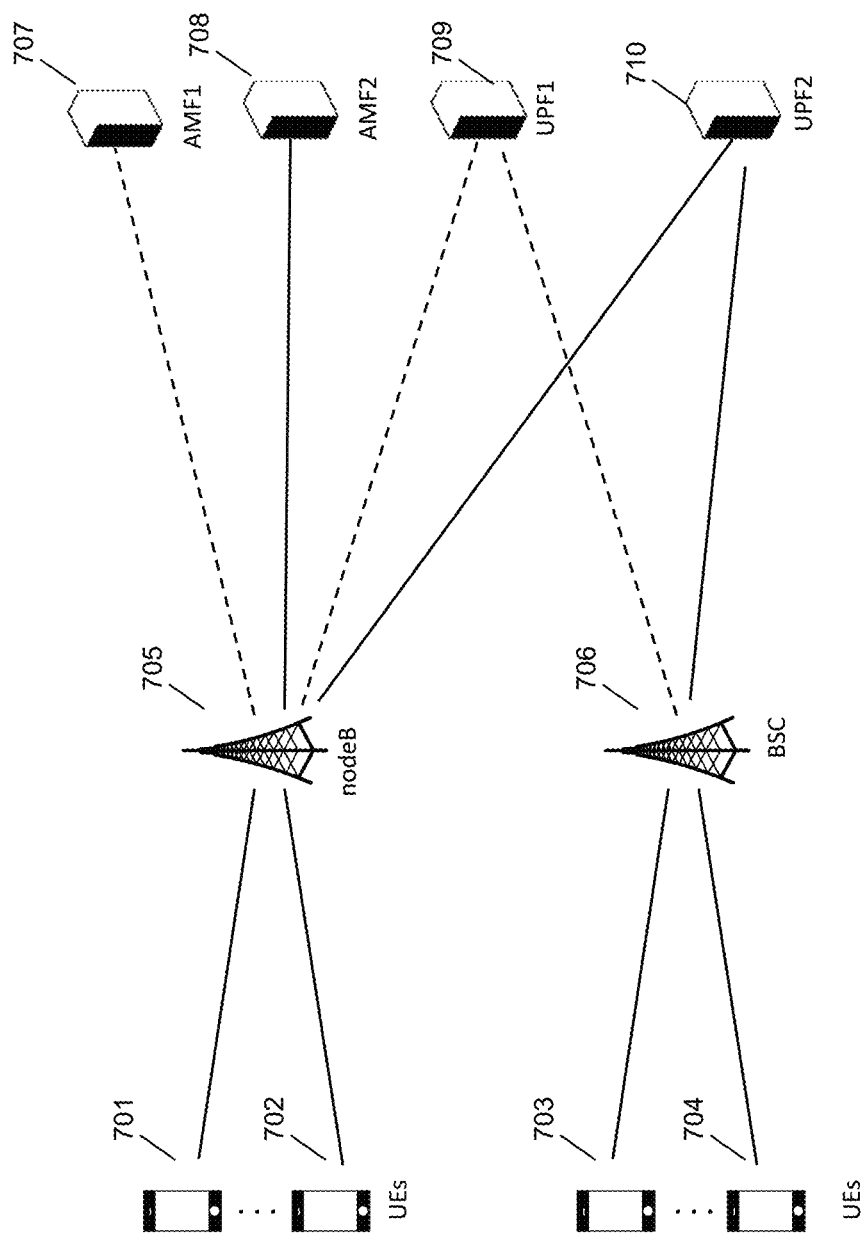
FIG. 7 is a system diagram wherein 5G connectivity to AMF or UPF is lost, in accordance with some embodiments.

FIG. 7 is a system diagram wherein 5G connectivity to AMF or UPF is lost, in accordance with some embodiments.

Migration of a group of UEs anchored on core node such as SGW/MME/PGW/AAA/SGSN/GGSN based on locally generated TEID so that UE connectivity is not affected due to a core node being unreachable. Identification of operators in MOCN and GWCN based on S1AP IP, etc. We assume that node allocating TEID from the pool of TEIDs identifying a peer node. Group GTPU TEID in a pool for particular peer node.

Allocation of TEIDs or core identifiers can be allocated from a base station, in some embodiments, or from a coordinating server, such as a Parallel Wireless HetNet Gateway. The coordinating server may be a gateway and may be managing or virtualizing the base station.

The disclosure herein can be applied to a core network of any RAT, including 2G, 3G, 5G, etc. For example, a 5G NSA or SA core could be identified using the method herein. For example, a 2G or 3G real or virtual core could be identified using the method herein. One core node or any number of core nodes could be identified using the method herein.

The disclosure herein could also be applied to MOCN (multi-operator core network) without modification, as MOCN cores act as typical cores for purposes of establishing GTP tunnels.

The disclosure herein could be applied to an edge core. An edge core is a real or virtual core network that is distributed throughout a telecommunications network to provide certain core services for a subset of base stations at a location closer to the base stations, i.e., at the edge of the network. For example, an edge core is suitable for providing super low latency services for 5G deployments. An edge core may include one or a plurality of core nodes or functionalities, and these nodes or functionalities could provide services for any or a combination of radio access technologies (e.g., 2G/3G/4G/5G/Wi-Fi; e.g., an SAEGW-U for 4G or a UPF for 5G or a TWAG-U for Wi-Fi). The use of an edge core to route and direct traffic particularly enables the use of IP backhaul to be used as local breakout (LBO) for voice and public Internet traffic that does not need to pass through the central core. An edge core could run on on-premise or private operator-owned infrastructure, public cloud, private cloud, or a mix of underlying hardware infrastructure. An edge core could use a service-oriented architecture to provide services to existing and legacy RAN and core nodes but in a distributed, virtualizable, highly available, resilient, and scalable way. Since the edge core is located at the edge, multiple edge locations can be provided, with as many edge cores as needed.

The disclosure herein could be used in conjunction with local breakout or RTP redirection (in some cases in conjunction with edge cores). In local breakout or edge core cases, in some embodiments, the TEID of the central core may be stored together with the TEID of the tunnel that exits via local breakout, so that it is possible to identify that a certain UE is attached to a certain central core even when local breakout is used. Tunnels with endpoints at an edge core, at a central core, or anywhere in between could be subject to the method described herein, and an edge core could be identified using tunnel identifiers as well as a central core.

Anywhere that tunnels are used, tunnel identifiers such as TEIDs can be used to provide the method herein. Where a plurality of tunnels is used, identification of a core can be performed by fingerprinting (e.g., storing a set of and/or a mapping of) a plurality of TEIDs or tunnel identifiers of the core.

Where network slicing is used, tunnel identifiers for a network slice may be available to nodes that have been assigned the network slice, and the available tunnel identifiers can be used to perform the method described herein to identify the core of that network slice, or, where multiple network slices share the same tunnel identifier, the shared tunnel identifier can be used to identify a single common core that is used across multiple network slices.

Wherever tunnel identifiers are available information in the system, it is possible to perform this method. It is possible to provide distributed core identification as well, where all or part of the identification occurs at a plurality of locations, at the edge, at RAN nodes or intermediate gateway nodes. In any of the scenarios described herein, where processing may be performed at the base station, the processing may also be performed in coordination with a cloud coordination server.

Figure 8:
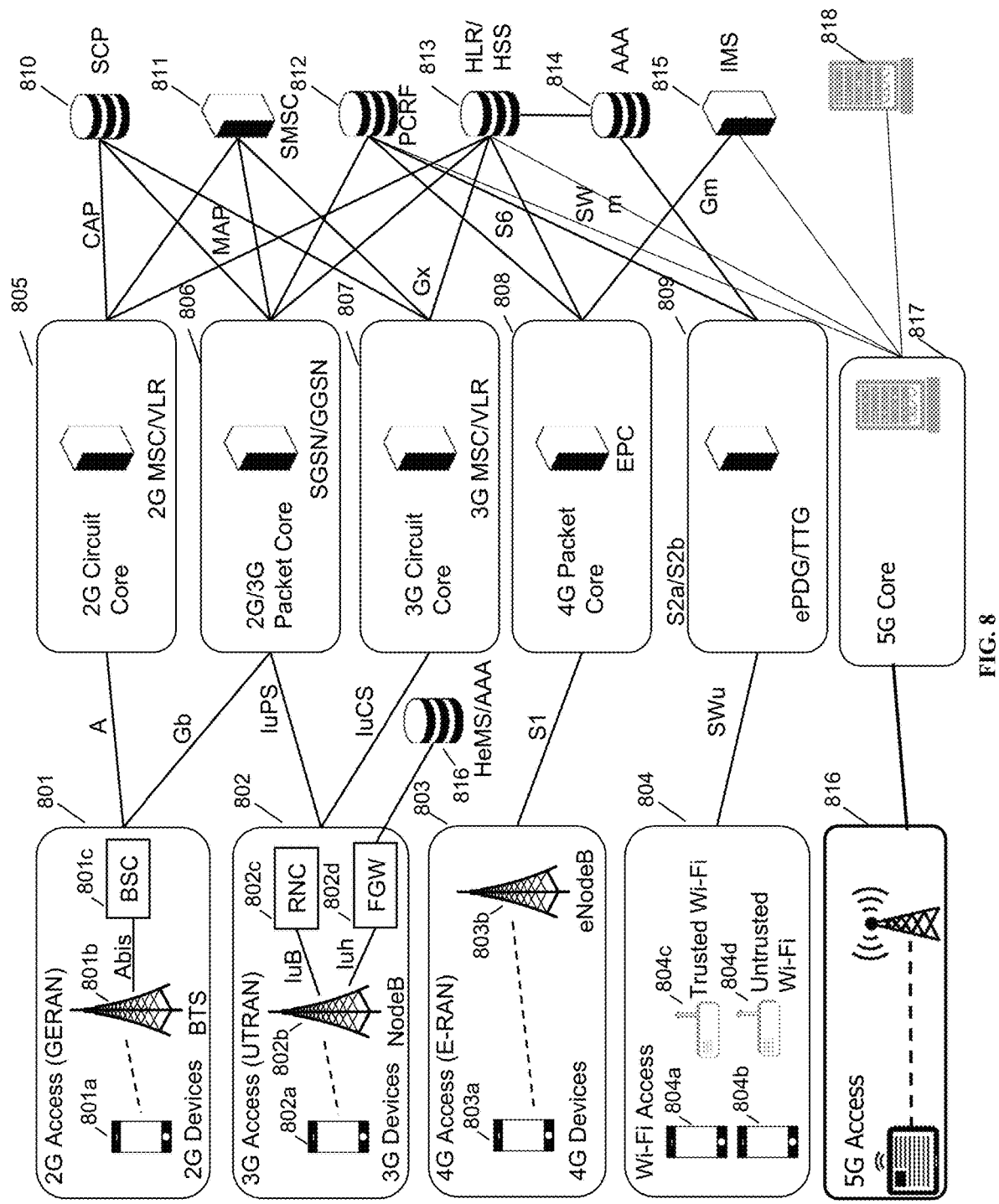
FIG. 8 is a schematic network architecture diagram for various radio access technology core networks.

FIG. 8 is a schematic network architecture diagram for 3G and other-G prior art networks. The diagram shows a plurality of "Gs," including 2G, 3G, 4G, 5G and Wi-Fi. 2G is represented by GERAN 801, which includes a 2G device 801a, BTS 801b, and BSC 801c. 3G is represented by UTRAN 802, which includes a 3G UE 802a, nodeB 802b, RNC 802c, and femto gateway (FGW, which in 3GPP namespace is also known as a Home nodeB Gateway or HNBGW) 802d. 4G is represented by EUTRAN or E-RAN 803, which includes an LTE UE 803a and LTE eNodeB 803b. Wi-Fi is represented by Wi-Fi access network 804, which includes a trusted Wi-Fi access point 804c and an untrusted Wi-Fi access point 804d. The Wi-Fi devices 804a and 804b may access either AP 804c or 804d. In the current network architecture, each "G" has a core network. 2G circuit core network 805 includes a 2G MSC/VLR; 2G/3G packet core network 806 includes an SGSN/GGSN (for EDGE or UMTS packet traffic); 3G circuit core 807 includes a 3G MSC/VLR; 4G circuit core 808 includes an evolved packet core (EPC); and in some embodiments the Wi-Fi access network may be connected via an ePDG/TTG using S2a/S2b. Each of these nodes are connected via a number of different protocols and interfaces, as shown, to other, non-"G"-specific network nodes, such as the SCP 830, the SMSC 831, PCRF 832, HLR/HSS 833, Authentication, Authorization, and Accounting server (AAA) 834, and IP Multimedia Subsystem (IMS) 835. An HeMS/AAA 836 is present in some cases for use by the 3G UTRAN. The diagram is used to indicate schematically the basic functions of each network as known to one of skill in the art, and is not intended to be exhaustive. For example, 5G core 817 is shown using a single interface to 5G access 816, although in some cases 5G access can be supported using dual connectivity or via a non-standalone deployment architecture.

Noteworthy is that the RANs 801, 802, 803, 804 and 836 rely on specialized core networks 805, 806, 807, 808, 809, 837 but share essential management databases 830, 831, 832, 833, 834, 835, 838. More specifically, for the 2G GERAN, a BSC 801c is required for Abis compatibility with BTS 801b, while for the 3G UTRAN, an RNC 802c is required for Iub compatibility and an FGW 802d is required for Iuh compatibility. These core network functions are separate because each RAT uses different methods and techniques. On the right side of the diagram are disparate functions that are shared by each of the separate RAT core networks. These shared functions include, e.g., PCRF policy functions, AAA authentication functions, and the like. Letters on the lines indicate well-defined interfaces and protocols for communication between the identified nodes.

Figure 9:
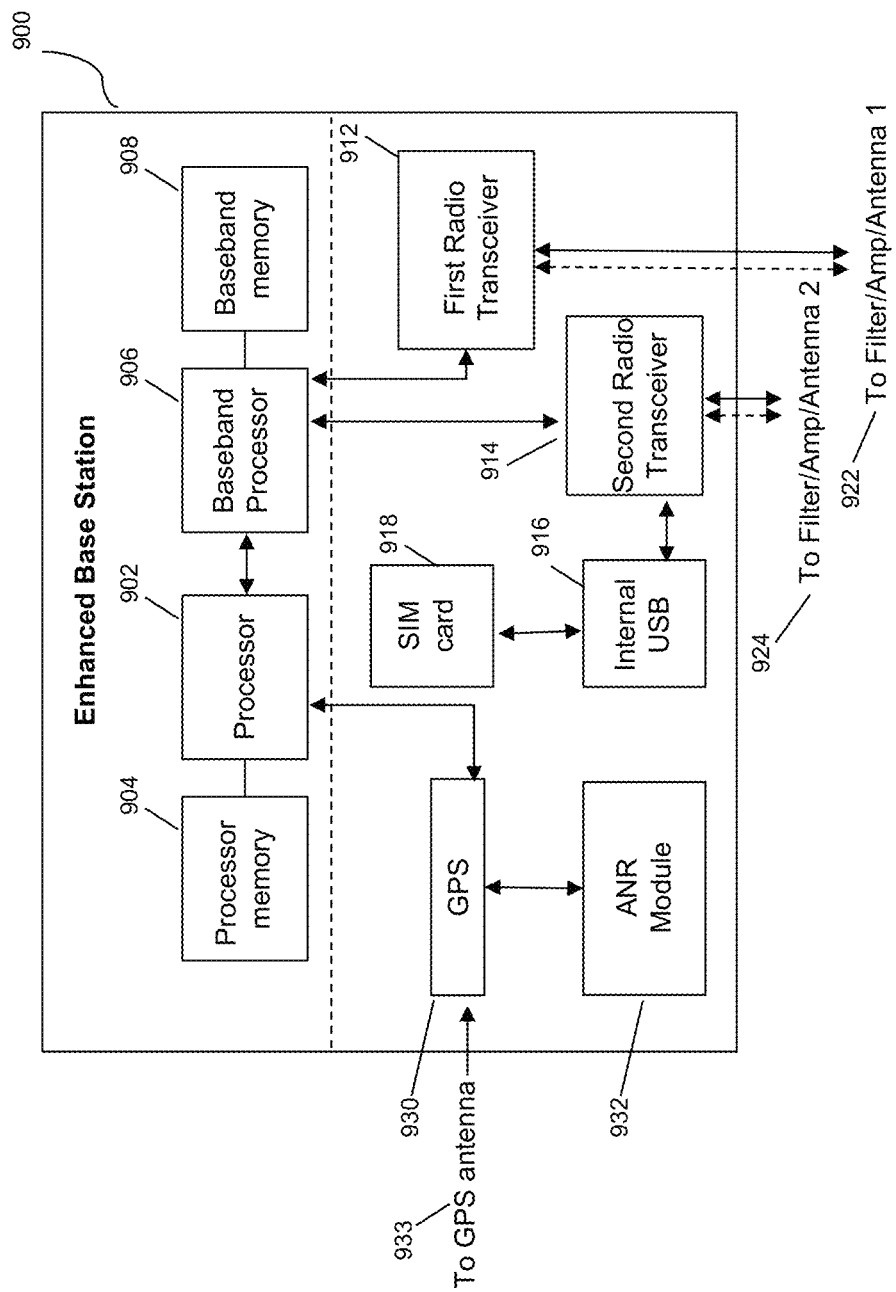
FIG. 9 is an enhanced eNodeB for performing the methods described herein, in accordance with some embodiments.

FIG. 9 is an enhanced base station for performing the methods described herein, in accordance with some embodiments. Base station 900 may include processor 902, processor memory 904 in communication with the processor, baseband processor 906, and baseband processor memory 908 in communication with the baseband processor. Mesh network node 900 may also include first radio transceiver 912 and second radio transceiver 914, internal universal serial bus (USB) port 916, and subscriber information module card (SIM card) 918 coupled to USB port 916. In some embodiments, the second radio transceiver 914 itself may be coupled to USB port 916, and communications from the baseband processor may be passed through USB port 916. The second radio transceiver may be used for wirelessly backhauling eNodeB 900.

Processor 902 and baseband processor 906 are in communication with one another. Processor 902 may perform routing functions, and may determine if/when a switch in network configuration is needed. Baseband processor 906 may generate and receive radio signals for both radio transceivers 912 and 914, based on instructions from processor 902. In some embodiments, processors 902 and 906 may be on the same physical logic board. In other embodiments, they may be on separate logic boards.

Processor 902 may identify the appropriate network configuration, and may perform routing of packets from one network interface to another accordingly. Processor 902 may use memory 904, in particular to store a routing table to be used for routing packets. Baseband processor 906 may perform operations to generate the radio frequency signals for transmission or retransmission by both transceivers 910 and 912. Baseband processor 906 may also perform operations to decode signals received by transceivers 912 and 914. Baseband processor 906 may use memory 908 to perform these tasks.

The first radio transceiver 912 may be a radio transceiver capable of providing LTE eNodeB functionality, and may be capable of higher power and multi-channel OFDMA. The second radio transceiver 914 may be a radio transceiver capable of providing LTE UE functionality. Both transceivers 912 and 914 may be capable of receiving and transmitting on one or more LTE bands. In some embodiments, either or both of transceivers 912 and 914 may be capable of providing both LTE eNodeB and LTE UE functionality. Transceiver 912 may be coupled to processor 902 via a Peripheral Component Interconnect-Express (PCI-E) bus, and/or via a daughtercard. As transceiver 914 is for providing LTE UE functionality, in effect emulating a user equipment, it may be connected via the same or different PCI-E bus, or by a USB bus, and may also be coupled to SIM card 918. First transceiver 912 may be coupled to first radio frequency (RF) chain (filter, amplifier, antenna) 922, and second transceiver 914 may be coupled to second RF chain (filter, amplifier, antenna) 924.

SIM card 918 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 900 is not an ordinary UE but instead is a special UE for providing backhaul to device 900.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 912 and 914, which may be 3G, 4G, 5G, Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 902 for reconfiguration.

A GPS module 930 may also be included, and may be in communication with a GPS antenna 932 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 932 may also be present and may run on processor 902 or on another processor, or may be located within another device, according to the methods and procedures described herein.

Other elements and/or modules may also be included, such as a home eNodeB, a local gateway (LGW), a self-organizing network (SON) module, or another module. Additional radio amplifiers, radio transceivers and/or wired network connections may also be included.

Figure 10:
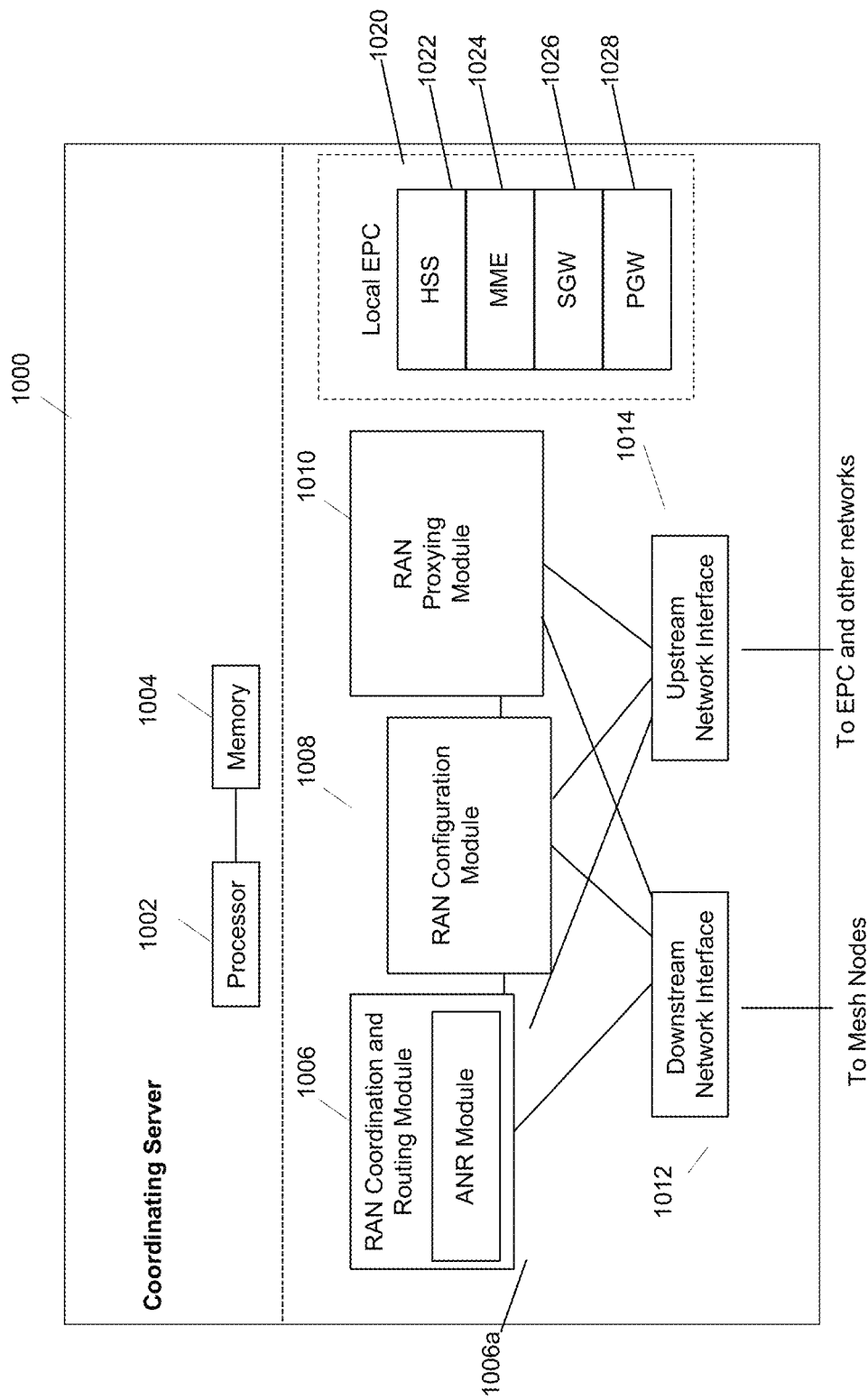
FIG. 10 is a coordinating server for providing services and performing methods as described herein, in accordance with some embodiments.

FIG. 10 is a coordinating server for providing services and performing methods as described herein, in accordance with some embodiments. Coordinating server 1000 includes processor 1002 and memory 1004, which are conFIG.d to provide the functions described herein. Also present are radio access network coordination/routing (RAN Coordination and routing) module 1006, including ANR module 1006a, RAN configuration module 1008, and RAN proxying module 1010. The ANR module 1006a may perform the ANR tracking, PCI disambiguation, ECGI requesting, and GPS coalescing and tracking as described herein, in coordination with RAN coordination module 1006 (e.g., for requesting ECGIs, etc.). In some embodiments, coordinating server 1000 may coordinate multiple RANs using coordination module 1006. In some embodiments, coordination server may also provide proxying, routing virtualization and RAN virtualization, via modules 1010 and 1008. In some embodiments, a downstream network interface 1012 is provided for interfacing with the RANs, which may be a radio interface (e.g., LTE), and an upstream network interface 1014 is provided for interfacing with the core network, which may be either a radio interface (e.g., LTE) or a wired interface (e.g., Ethernet).

Coordinator 1000 includes local evolved packet core (EPC) module 1020, for authenticating users, storing and caching priority profile information, and performing other EPC-dependent functions when no backhaul link is available. Local EPC 1020 may include local HSS 1022, local MME 1024, local SGW 1026, and local PGW 1028, as well as other modules. Local EPC 1020 may incorporate these modules as software modules, processes, or containers. Local EPC 1020 may alternatively incorporate these modules as a small number of monolithic software processes. Modules 1006, 1008, 1010 and local EPC 1020 may each run on processor 1002 or on another processor, or may be located within another device.

The protocols described herein have largely been adopted by the 3GPP as a standard for the upcoming 5G network technology as well, in particular for interfacing with 4G/LTE technology. For example, X2 is used in both 4G and 5G and is also complemented by 5G-specific standard protocols called Xn. Additionally, the 5G standard includes two phases, non-standalone (which will coexist with 4G devices and networks) and standalone, and also includes specifications for dual connectivity of UEs to both LTE and NR ("New Radio") 5G radio access networks. The inter-base station protocol between an LTE eNB and a 5G gNB is called Xx. The specifications of the Xn and Xx protocol are understood to be known to those of skill in the art and are hereby incorporated by reference dated as of the priority date of this application.

In some embodiments, several nodes in the 4G/LTE Evolved Packet Core (EPC), including mobility management entity (MME), MME/serving gateway (S-GW), and MME/S-GW are located in a core network. Where shown in the present disclosure it is understood that an MME/S-GW is representing any combination of nodes in a core network, of whatever generation technology, as appropriate. The present disclosure contemplates a gateway node, variously described as a gateway, HetNet Gateway, multi-RAT gateway, LTE Access Controller, radio access network controller, aggregating gateway, cloud coordination server, coordinating gateway, or coordination cloud, in a gateway role and position between one or more core networks (including multiple operator core networks and core networks of heterogeneous RATs) and the radio access network (RAN). This gateway node may also provide a gateway role for the X2 protocol or other protocols among a series of base stations. The gateway node may also be a security gateway, for example, a TWAG or ePDG. The RAN shown is for use at least with an evolved universal mobile telecommunications system terrestrial radio access network (E-UTRAN) for 4G/LTE, and for 5G, and with any other combination of RATs, and is shown with multiple included base stations, which may be eNBs or may include regular eNBs, femto cells, small cells, virtual cells, virtualized cells (i.e., real cells behind a virtualization gateway), or other cellular base stations, including 3G base stations and 5G base stations (gNBs), or base stations that provide multi-RAT access in a single device, depending on context.

In the present disclosure, the words "eNB," "eNodeB," and "gNodeB" are used to refer to a cellular base station. However, one of skill in the art would appreciate that it would be possible to provide the same functionality and services to other types of base stations, as well as any equivalents, such as Home eNodeBs. In some cases Wi-Fi may be provided as a RAT, either on its own or as a component of a cellular access network via a trusted wireless access gateway (TWAG), evolved packet data network gateway (ePDG) or other gateway, which may be the same as the coordinating gateway described hereinabove.

The word "X2" herein may be understood to include X2 or also Xn or Xx, as appropriate. The gateway described herein is understood to be able to be used as a proxy, gateway, B2BUA, interworking node, interoperability node, etc. as described herein for and between X2, Xn, and/or Xx, as appropriate, as well as for any other protocol and/or any other communications between an LTE eNB, a 5G gNB (either NR, standalone or non-standalone). The gateway described herein is understood to be suitable for providing a stateful proxy that models capabilities of dual connectivity-capable handsets for when such handsets are connected to any combination of eNBs and gNBs. The gateway described herein may perform stateful interworking for master cell group (MCG), secondary cell group (SCG), other dual-connectivity scenarios, or single-connectivity scenarios.

In some embodiments, the base stations described herein may be compatible with a Long Term Evolution (LTE) radio transmission protocol, or another air interface. The LTE-compatible base stations may be eNodeBs, or may be gNodeBs, or may be hybrid base stations supporting multiple technologies and may have integration across multiple cellular network generations such as steering, memory sharing, data structure sharing, shared connections to core network nodes, etc. In addition to supporting the LTE protocol, the base stations may also support other air interfaces, such as UMTS/HSPA, CDMA/CDMA2000, GSM/EDGE, GPRS, EVDO, other 3G/2G, legacy TDD, 5G, or other air interfaces used for mobile telephony. In some embodiments, the base stations described herein may support Wi-Fi air interfaces, which may include one of 802.11a/b/g/n/ac/ad/af/ah. In some embodiments, the base stations described herein may support 802.16 (WiMAX), or other air interfaces. In some embodiments, the base stations described herein may provide access to land mobile radio (LMR)-associated radio frequency bands. In some embodiments, the base stations described herein may also support more than one of the above radio frequency protocols, and may also support transmit power adjustments for some or all of the radio frequency protocols supported.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods for providing interference mitigation are described in reference to the Long Term Evolution (LTE) standard, one of skill in the art would understand that these systems and methods could be adapted for use with other wireless standards or versions thereof. The inventors have understood and appreciated that the present disclosure could be used in conjunction with various network architectures and technologies. Wherever a 4G technology is described, the inventors have understood that other RATs have similar equivalents, such as a gNodeB for 5G equivalent of eNB. Wherever an MME is described, the MME could be a 3G RNC or a 5G AMF/SMF. Additionally, wherever an MME is described, any other node in the core network could be managed in much the same way or in an equivalent or analogous way, for example, multiple connections to 4G EPC PGWs or SGWs, or any other node for any other RAT, could be periodically evaluated for health and otherwise monitored, and the other aspects of the present disclosure could be made to apply, in a way that would be understood by one having skill in the art.

Additionally, the inventors have understood and appreciated that it is advantageous to perform certain functions at a coordination server, such as the Parallel Wireless HetNet Gateway, which performs virtualization of the RAN towards the core and vice versa, so that the core functions may be statefully proxied through the coordination server to enable the RAN to have reduced complexity. Therefore, at least four scenarios are described: (1) the selection of an MME or core node at the base station; (2) the selection of an MME or core node at a coordinating server such as a virtual radio network controller gateway (VRNCGW); (3) the selection of an MME or core node at the base station that is connected to a 5G-capable core network (either a 5G core network in a 5G standalone configuration, or a 4G core network in 5G non-standalone configuration); (4) the selection of an MME or core node at a coordinating server that is connected to a 5G-capable core network (either 5G SA or NSA). In some embodiments, the core network RAT is obscured or virtualized towards the RAN such that the coordination server and not the base station is performing the functions described herein, e.g., the health management functions, to ensure that the RAN is always connected to an appropriate core network node. Different protocols other than S1AP, or the same protocol, could be used, in some embodiments.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, 2G, 3G, 5G, TDD, or other air interfaces used for mobile telephony.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims.

The invention claimed is:

1. A method for providing core High Availability (HA) for a wireless network, comprising:
   providing a first node, a second node and a third node;
   allocating a set of locally generated Tunnel Endpoint Identifiers (TEIDs) for UEs anchored on the second node;
   detecting, by a first node, a second node having a connectivity issue; and
   migrating a User Equipment (UE) connected to the second node to a third node which is accessible; using the set of locally generated TEIDs to identify the UE migration.

2. The method of claim 1 wherein the first node comprises a HetNet Gateway (HNG), the second node comprises a first SGW, and the third node comprises a second SGW.

3. The method of claim 1 wherein the first node comprises a HetNet Gateway (HNG), the second node comprises a first MME, and the third node comprises a second MME.

4. The method of claim 1 wherein the first node comprises a controller, the second node comprises a first SGW, and the third node comprises a second SGW.

5. The method of claim 1 wherein the first node comprises a controller or ePDG/TWANGW HetNet Gateway (HNG), the second node comprises a second PGW, and the third node comprises a third PGW.

6. The method of claim 1 wherein the first node comprises a controller or ePDG/TWANGW HetNet Gateway (HNG), the second node comprises a first AAA, and the third node comprises a second AAA.

7. The method of claim 1 wherein the wireless network is a Mobile Operator Core Network (MOCN) or a Gateway Core Network (GWCN) and using at least a portion of S1 Application Protocol (S1AP) Identifiers (IDs) to identify all UEs belonging to individual operators and to identify operators belonging to all UEs.

8. A system for providing core High Availability (HA) for a wireless network, comprising:
  a first node;
  a second node in communication with the first node;
  a third node in communication with the first node and the second node;
  wherein a set of locally generated Tunnel Endpoint Identifiers (TEIDs) are identified for UEs anchored on the second node;
  wherein the first node detects the second node having a connectivity issue; and
  wherein a User Equipment (UE) connected to the second node is migrated to the third node using the set of locally generated TEIDs to identify the UE migration.

9. The system of claim 8 wherein the first node comprises a HetNet Gateway (HNG), the second node comprises a first SGW, and the third node comprises a second SGW.

10. The system of claim 8 wherein the first node comprises a HetNet Gateway (HNG), the second node comprises a first MME, and the third node comprises a second MME.

11. The system of claim 8 wherein the first node comprises a controller, the second node comprises a first SGW, and the third node comprises a second SGW.

12. The system of claim 8 wherein the first node comprises a controller or ePDG/TWANGW HetNet Gateway (HNG), the second node comprises a second PGW, and the third node comprises a third PGW.

13. The system of claim 8 wherein the first node comprises a controller or ePDG/TWANGW HetNet Gateway (HNG), the second node comprises a first AAA, and the third node comprises a second AAA.

14. The system of claim 8 wherein the wireless network is a Mobile Operator Core Network (MOCN) or a Gateway Core Network (GWCN) and using at least a portion of S1 Application Protocol (S1AP) Identifiers (IDs) to identify all UEs belonging to individual operators and to identify operators belonging to all UEs.

15. A non-transitory computer-readable medium containing instructions for core High Availability (HA) for a wireless network which, when executed, cause a first node node to perform steps comprising:
  detecting, by a first node, a second node having a connectivity issue; and
  migrating a User Equipment (UE) connected to the second node to a third node which is accessible; using the set of locally generated TEIDs for UEs anchored on the second node to identify the UE migration.

16. The non-transitory computer-readable medium of claim 15 further comprising instructions wherein the first node comprises a HetNet Gateway (HNG), the second node comprises a first SGW, and the third node comprises a second SGW.

17. The non-transitory computer-readable medium of claim 15 further comprising instructions wherein the first node comprises a HetNet Gateway (HNG), the second node comprises a first MME, and the third node comprises a second MME.

18. The non-transitory computer-readable medium of claim 15 further comprising instructions wherein the first node comprises a controller, the second node comprises a first SGW, and the third node comprises a second SGW.

19. The non-transitory computer-readable medium of claim 15 further comprising instructions wherein the first node comprises a controller or ePDG/TWANGW HetNet Gateway (HNG), the second node comprises a second PGW, and the third node comprises a third PGW.

20. The non-transitory computer-readable medium of claim 15 further comprising instructions wherein the first node comprises a controller or ePDG/TWANGW HetNet Gateway (HNG), the second node comprises a first AAA, and the third node comprises a second AAA; or wherein the wireless network is a Mobile Operator Core Network (MOCN) or a Gateway Core Network (GWCN) and using at least a portion of S1 Application Protocol (S1AP) Identifiers (IDs) to identify all UEs belonging to individual operators and to identify operators belonging to all UEs.

* * * * *